US006952602B2

(12) United States Patent
Deng

(10) Patent No.: US 6,952,602 B2
(45) Date of Patent: Oct. 4, 2005

(54) GPS RECEIVING ANTENNA FOR CELLULAR PHONE

(75) Inventor: Sheng Ming Deng, Hsinchu (TW)

(73) Assignee: Inpaq Technology Co. Ltd., Hsinchu (TW)

( * ) Notice: Subject to any disclaimer, the term of this patent is extended or adjusted under 35 U.S.C. 154(b) by 337 days.

(21) Appl. No.: 10/261,689

(22) Filed: Oct. 2, 2002

(65) Prior Publication Data

US 2004/0204008 A1 Oct. 14, 2004

(51) Int. Cl.7 .................................................. H04B 1/38

(52) U.S. Cl. .................. 455/575.1; 455/90.3; 455/90.1; 343/702; 343/700 MS

(58) Field of Search ........................... 455/575.1, 575.5, 455/575.7, 90.1, 90.2, 90.3, 550.1, 347, 344, 128, 129; 343/702, 700 MS

(56) References Cited

U.S. PATENT DOCUMENTS 5,255,001 A * 10/1993 Tamura et al. .............. 343/702
5,392,054 A * 2/1995 Bottomley et al. ......... 343/702
5,517,676 A * 5/1996 Sekine et al. ............ 455/575.5
5,760,745 A * 6/1998 Endo et al. ................. 343/702
5,784,032 A * 7/1998 Johnston et al. ............ 343/702
5,919,239 A * 7/1999 Fraker et al. ................. 701/35
5,977,916 A * 11/1999 Vannatta et al. ............ 343/702
5,991,643 A * 11/1999 Chao-Cheng ............ 455/575.7
6,348,897 B1 * 2/2002 Alameh et al. ............. 343/702
6,377,827 B1 * 4/2002 Rydbeck .................. 455/575.3
6,452,553 B1 * 9/2002 Cohen ........................ 343/702
6,515,630 B2 * 2/2003 Honda ........................ 343/702
6,593,897 B1 * 7/2003 McConnell ................. 343/841
2003/0160726 A1 * 8/2003 Grant et al. ................ 343/702
2003/0189520 A1 * 10/2003 Goto et al. ................. 343/702
2003/0190896 A1 * 10/2003 Ota et al. .................. 455/90.3
2004/0090389 A1 * 5/2004 Jo et al. ..................... 343/797

* cited by examiner

*Primary Examiner*—Nay Maung
*Assistant Examiner*—Edan Orgad
(74) *Attorney, Agent, or Firm*—Troxell Law Office, PLLC

(57) ABSTRACT

A GPS receiving antenna for cellular phone is configurated into a L-shaped frame, a Y-shaped frame, or a U-shaped frame so as to achieve the best capturing effect of the radio wave radiated from the satellite. It is not necessary to use materials of specially high dielectric constant for fabrication of these antennas so that the production cost can be minimized and fabrication process can be simplified (FIG. 2).

3 Claims, 4 Drawing Sheets

GPS RECEIVING ANTENNA FOR CELLULAR PHONE

BACKGROUND OF THE INVENTION

1. Field of the Invention

The present invention relates to a GPS (global positioning system) receiving antenna for cellular phone, and more particularly, to specially constructed L-shaped, Y-shaped, and U-shaped receiving antennas for cellular phone capable of most effectively abstracting energy of the radio wave from the satellite, and the above-mentioned antennas can be fabricated easily with a reduced production cost.

2. Description of the Prior Art

According to USE-911 regulations, the cellular phone is obligated to have positioning function, and one of the most well-known positioning system is GPS wherein a cellular phone is equipped with a receiving antenna capable of receiving radio wave signals radiated from the satellite.

For smoothly receiving radio wave signals, a receiving antenna has to bring into consideration the following factors:

1. The wavelength of the received radio signal is about 20 cm. If a ¼ wavelength antenna is to be used, the required length is 5 cm.
2. The capturing pattern of the receiving antenna should be upwardly directed to the sky for abstracting energy of the radio wave from the satellite so as to eliminate any possible dead angle.
3. In view of the fact that the field distribution under the satellite transmitting antenna is in a clockwise circular polarization pattern, the receiving antenna shall be configurated to match this pattern so as to effectively abstract energy of the radio wave radiated from the satellite antenna. Should the antenna be configurated to match the linear polarization, the receivable wave energy will be halved. As it is well known, the radio wave energy radiated from the satellite antenna is very weak, so that using an unmatched receiving antenna for the cellular phone may result in failing to catch the coming signal successfully.

Accordingly, for a remedy to afore-mentioned defect, a high dielectric constant ceramic material is employed to form into a patch-receiving antenna for the cellular phone. In fact, the configuration of a patch antenna is suitable for upwardly directing to capture the circularly polarized clockwise spinning radio wave. In addition, the driftage of the received signals never happens to the receiving patch antenna because the ceramic is insensitive to temperature variation.

There are several types of patch antenna that have been used for the cellular phone as shown in FIG. 1*a* and FIG. 1*b*.

Referring to FIG. 1*a*, the receiving antenna is equipped on the rear housing surface of the phone. It is advantageous that the gain of the receiving antenna will be considerably high due to both large antenna size and grounding area thereof, and can be fabricated with a simple process. However, by equipping the receiving antenna only on the rear housing surface of the phone causes acceptable radio wave energy radiated from the satellite to be limited to that arriving at the rear housing surface only and leaving the front housing surface dummy. Although the top portion of the antenna facing to the satellite can receive the linearly polarized signals, yet the effect is not significant.

Referring to FIG. 1*b*, the receiving antenna is equipped on a part of top housing surface of the cellular phone. By doing so, unmatching problem as that mentioned in the above example is solved by abstracting polarized radio wave energy downwardly radiated from the satellite. However, a material of very high dielectric property must be selected to construct the receiving antenna which is deemed to be equipped on so narrow top surface area that having a width less than 10 mm. As a result, the antenna power loss is increased, and its gain is reduced. Besides, a highly precise technology is required for fabricating such a small-sized antenna that results in a poor yield.

Aiming at the above-depicted defects, the present invention is to propose a newly developed GPS receiving antenna for cellular phone capable of rectifying the above depicted defects and operating effectively and sensitively to receive the radio signal from the satellite.

SUMMARY OF THE INVENTION

The present invention is disclosed for overcoming the aforesaid shortcomings inherent to the prior arts.

Accordingly, it is an object of the present invention to provide a newly developed GPS receiving antenna for cellular phone capable of constantly aiming at the radio wave field radiated from the satellite so as to match with the field polarization pattern either the cellular phone body is placed horizontally or vertically.

It is another object of the present invention to provide a GPS receiving antenna for cellular phone capable of abstracting energy of the radio wave from the satellite in the most efficient way.

It is one more object of the present invention to provide a GPS receiving antenna for cellular phone capable of maintaining the effective wave capturing area on the antenna body so as to increase the gain of the antenna, and the antenna can be fabricated easily.

To achieve these and other objects described above, the antenna of the present invention is constructed in L, Y, and U-shaped frame type structure and attached to the relevant surface portion of the cellular phone housing without requiring use of materials of high dielectric strength.

BRIEF DESCRIPTION OF THE DRAWINGS

To enable a further understanding of the innovative and technological content of the invention herein, refer to the detailed description of the invention and the accompanying drawings.

DETAILED DESCRIPTION OF THE PREFERRED EMBODIMENT

Figure 1A:
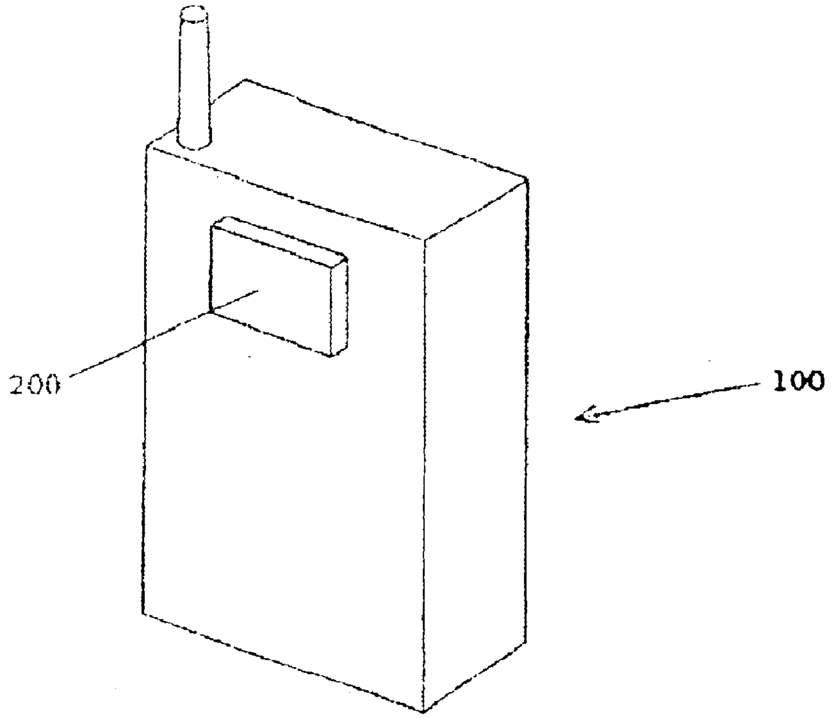
Fig. 1a (PRIOR ART)
FIGS. 1*a* and 1*b* are both schematic views of a conventional GPS receiving antenna for cellular phone.
Figure 1B:
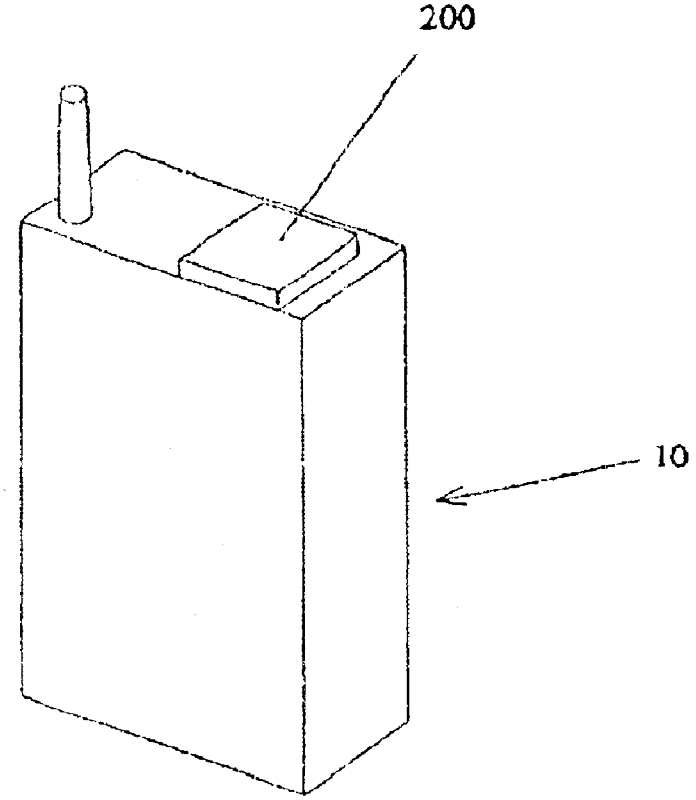
Fig. 1b (PRIOR ART)

Two examples of conventional GPS receiving antenna for cellular phone shown in FIGS. 1*a* and 1*b* have been discussed with respect to their merits and disadvantages in the foregoing paragraphs. Therefore, it is not necessary to repeat herein.

Figure 2:
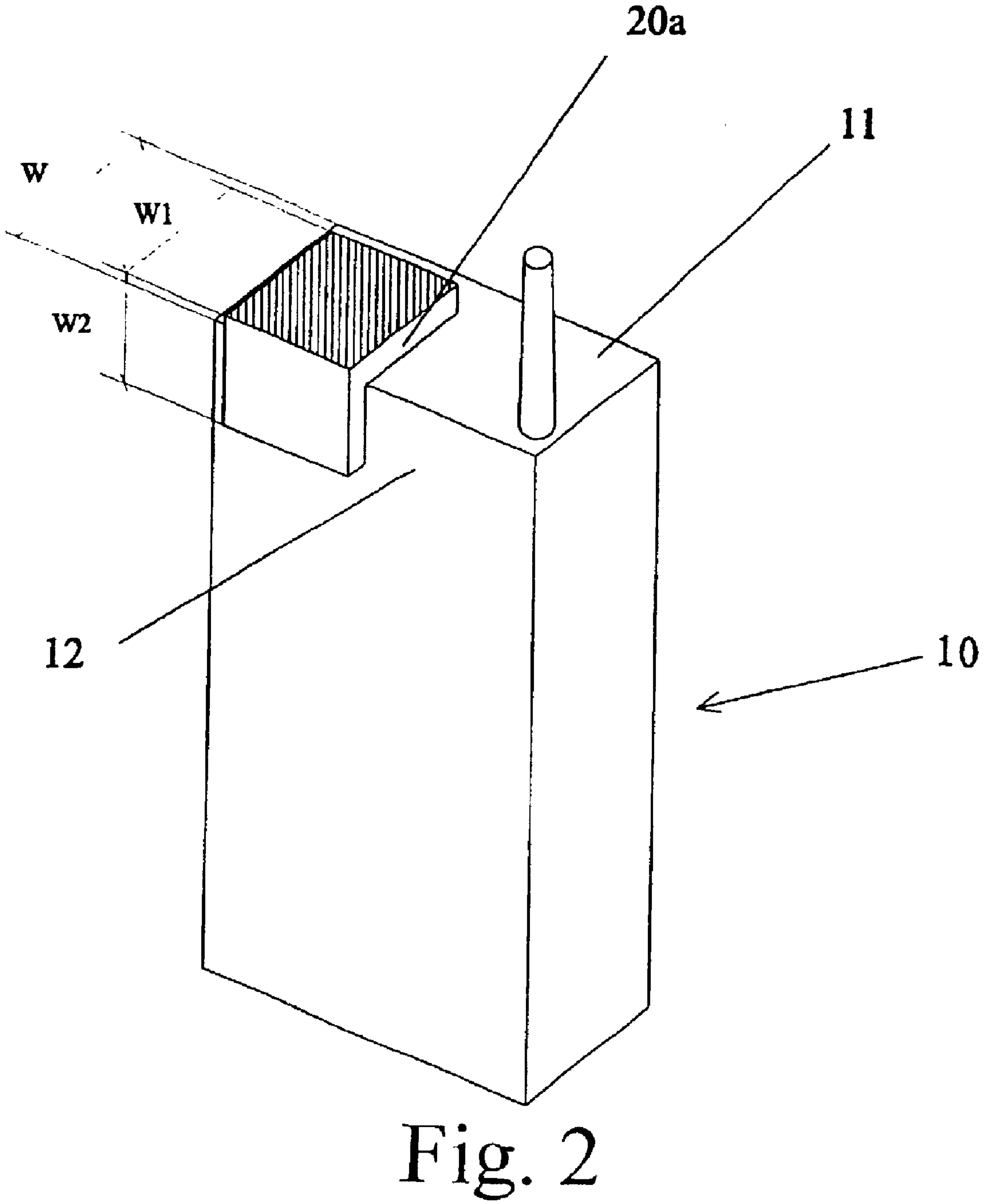
FIG. 2 is a schematic view in a first embodiment of the present invention.

FIG. 2 is a schematic view in a first embodiment of the present invention. It is shown that a GPS receiving antenna for cellular phone is formed of a L-shaped frame 20*a*, and it is further divided into two parts. One is covering on the top part 11 of a phone body 10 offset to one side (hatched lines portion), while the other is covering down from the first part on the corresponding upper rear housing surface 12. As shown in FIG. 2, W1 denotes the width of the first part covering on the top surface 11, and W2 is the vertical width of the second part covering on the upper rear housing surface 12. Therefore, W1+W2 is the total width of the L-shaped frame 20*a* covering the top surface 11 of the phone body 10. As W1 which is smaller than W, the width of the top part 11, can be calculated by trail and error such that the area of the L-shaped frame 20*a* covering on top surface 11 of the phone body 10 is defined at a relevant value with reference to the dielectric loss and the properties of the material used thereby keeping the aiming direction of the receiving antenna is fully in match with the polarized pattern of the radiation radio wave from the satellite so as to abstract energy of the radio wave in the most efficient way.

Figure 3A:
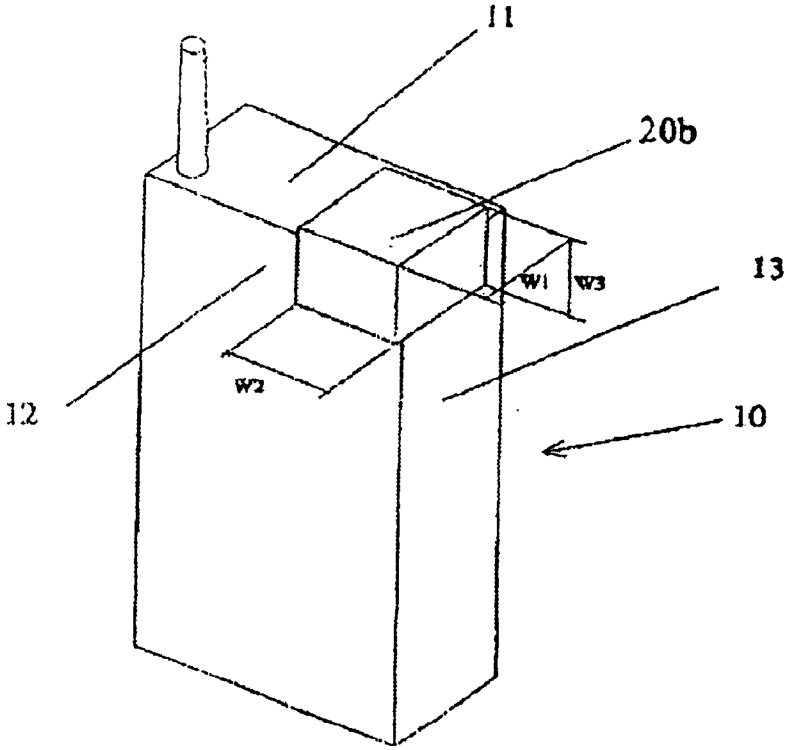
FIGS. 3*a* and 3*b* are both schematic views in a second embodiment of the present invention.
Figure 3B:
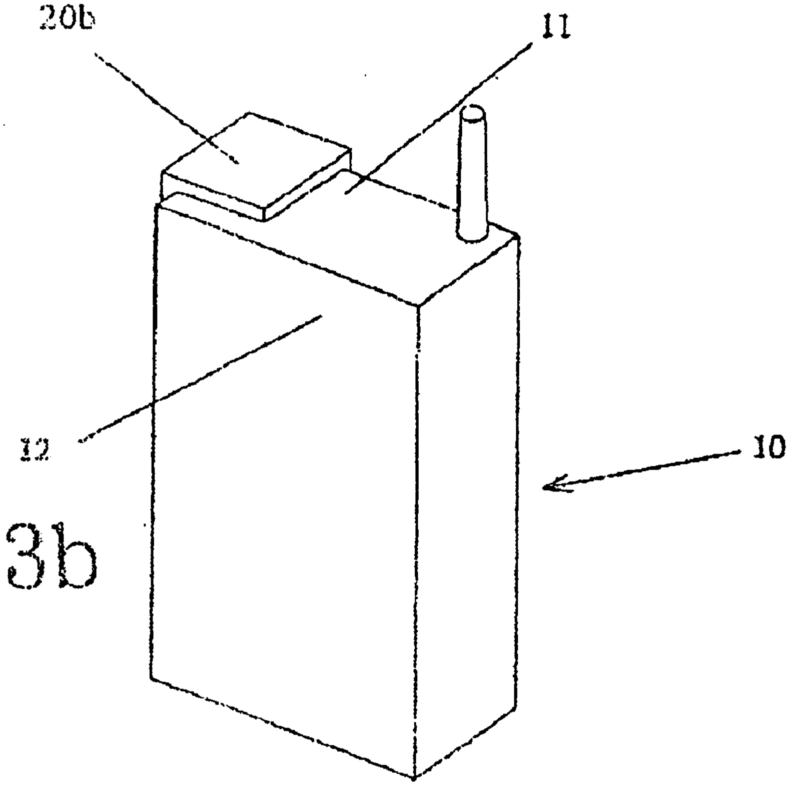

FIGS. 3*a* and 3*b* are both schematic views in a second embodiment of the present invention. In this embodiment, the GPS receiving antenna is formed in a Y-shaped frame 20*b* which is an extended form of the L-shaped frame 20*a* by adding an extra leg. The Y-shaped frame 20*b* covers the phone body 10 on the top part 11, the rear part 12, and an additional side part 13, all occupy the upper corner portion of the phone body 10. The structure of the Y-shaped frame 20*b* is so constructed that it is well suitable for capturing the circularly polarized radio wave signals radiated from the satellite. Moreover, a favorable matching effect can be obtained by relevantly adjusting the value of W1, W2, and W3.

Figure 4:
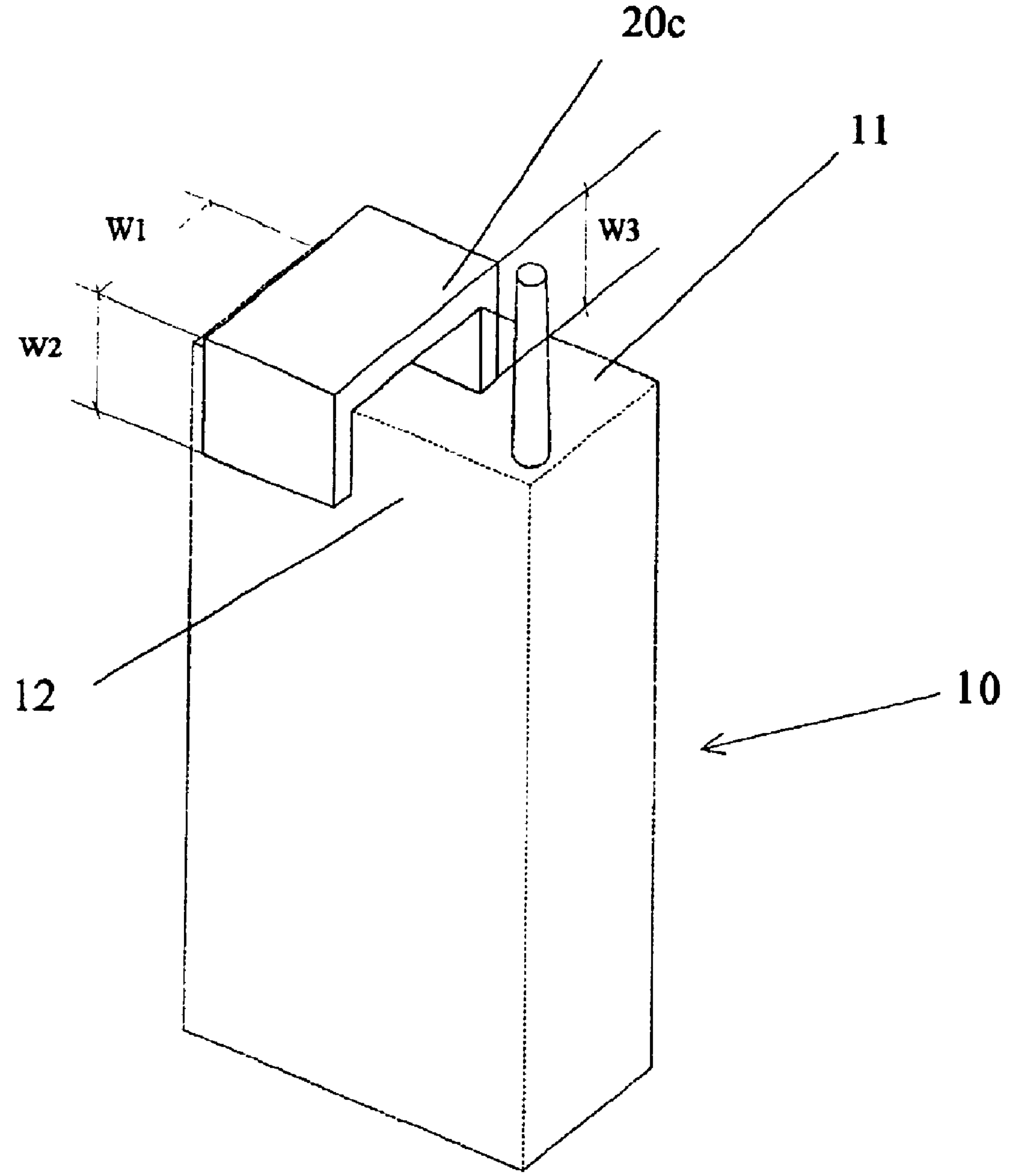
FIG. 4 is a schematic view in a third embodiment of the present invention.

FIG. 4 is a schematic view of a third embodiment of the present invention. In this embodiment, the GPS receiving antenna is formed into a U-shaped frame 20*c,* wherein W1+W2+W3 is the width of the U-shaped frame 20*c* covering the phone body 10 and W1 is the width, which covers on the top surface 11 thereof. It is well known that a U-shaped receiving antenna is a preferably configurated antenna to capture the circularly polarized radio wave signal radiated from the satellite. Besides, by keeping total length L (W1+W2+W3) of the U-shaped frame 20*c,* a fixed value and varying the values of W1, W2, and W3, the dimension for the U-shaped frame 20*c* which can work most efficiently can be determined.

It is understood from the foregoing description that the L-shaped, Y-shaped, and U-shaped frame type receiving antennas for cellular phone are workable most efficiently in BPS, and such simple structures are easy to fabricate with minimized production cost through quick fabrication process.

Although the invention has been described in terms of preferred embodiments, it is apparent that numerous variations and modifications may be made without departing from the true spirit and scope thereof, as set forth in the following claims.

What is claimed is:

1. A GPS receiving antenna for a cellular phone comprising: a non-patch type frame located on a housing surface of the cellular phone and having at least two sections including first and second sections forming an L-shape, the first section being located on a top surface of the housing and the second section being located on one of a front surface and a back surface of the housing, and the first section having a width less than a width of the front surface of the housing.

2. The GPS receiving antenna according to claim 1, wherein the at least two sections include a third section located on a side surface of the housing and connected to both the first and the second sections, intersecting lines of the first, second, and third sections form a Y-shape.

3. The GPS receiving antenna according to claim 1, wherein the at least two surfaces include a third section connected to the first section on an end opposite the second section, the first, second, and third sections form a U-shape, the second section is located on the front surface of the housing, and the third section is located on the rear of the housing.

* * * * *